United States Patent [19]

Macfarlane, deceased et al.

[11] Patent Number: 4,859,480

[45] Date of Patent: Aug. 22, 1989

[54] COMPOSITION AND METHOD FOR TREATING HAY AND SIMILAR MATTER

[75] Inventors: John O. Macfarlane, deceased, late of Overland Park; John A. MacFarlane, personal representative, Fairbanks, Ak.

[73] Assignee: Tillin, Inc., Shawnee, Kans.

[21] Appl. No.: 101,805

[22] Filed: Sep. 28, 1987

Related U.S. Application Data

[63] Continuation of Ser. No. 903,211, Sep. 2, 1986.

[51] Int. Cl.$^4$ ................................................. A23K 3/00
[52] U.S. Cl. ...................................... 426/310; 426/335; 426/532; 426/602
[58] Field of Search ............... 426/310, 335, 532, 602, 426/610, 512, 635, 636, 321; 106/146, 147, 141

[56] References Cited

U.S. PATENT DOCUMENTS

| | | | |
|---|---|---|---|
| 1,013,568 | 1/1912 | Sharpe, Jr. | 426/321 |
| 1,603,136 | 10/1926 | Messmer | 426/335 |
| 2,021,996 | 11/1935 | Henglein | 426/321 |
| 2,054,026 | 9/1936 | Steindorff et al. | 426/321 |
| 2,160,167 | 5/1939 | Pfeiffer | 426/321 |
| 2,160,168 | 5/1939 | Pfeiffer | 426/321 |
| 2,263,746 | 11/1941 | Stauf et al. | 426/321 |
| 2,552,059 | 5/1951 | Pfuetzer et al. | 252/400.52 |
| 3,948,924 | 4/1976 | Giller et al. | 546/315 |
| 3,965,266 | 6/1976 | Jackson | 426/97 |
| 3,971,855 | 7/1976 | Jackson | 426/321 |
| 4,370,353 | 1/1983 | Yagi et al. | 426/613 X |
| 4,448,707 | 5/1984 | Fenn | 252/194 |

*Primary Examiner*—Donald E. Czaja
*Assistant Examiner*—Celine T. Callahan
*Attorney, Agent, or Firm*—Wm. Bruce Day

[57] ABSTRACT

A method of preserving agricultural products or materials such as hay and silage is disclosed. The method comprises the utilization of a composition for coating the material in order to form a water-repellent protective coating thereon. Preferably the coating includes a preserving agent, having substantial antimicrobial activity. Further, in some instances the coating may include an adhesive forming constituent enabling outer layers of material to become tightly bound in the stack, bale or pile of material being treated. When the latter adhesive compositions are utilized, the treated material tends to retain its physical integrity, against loose portions becoming detached therefrom. Also disclosed are preferred compositions for achieving the methods of treatment, and also preferred methods for preparing certain of the preferred compositions.

6 Claims, No Drawings

COMPOSITION AND METHOD FOR TREATING HAY AND SIMILAR MATTER

This is a continuation of application Ser. No. 903,211 filed Sept. 2, 1986.

BACKGROUND OF THE INVENTION

The present invention relates to methods of treating agricultural materials and in particular to methods of treating cut or harvested hay, milo and similar materials. The method is particularly adapted to the treatment of freshly cut hay and to the preservation of hay bales or haystacks by the application of preferred compositions according to this disclosure.

Freshly cut hay is generally processed into bales or stacks for storage. These have been of a variety of sizes, but in the past most hay bales, such as square bales, were usually 2 to 3 cubic feet in size. However, more recently newer baling techniques have led to production of large circular bales of about 100 cubic feet in size and weighing 1,200 to 1,500 pounds. Also, many hay cutting and storing techniques produce very large stacks that are much larger than even the largest bales.

Hay bales and/or stacks may be transported over considerable distances and stored for considerable lengths of time before use. During any transport or storage both physical and chemical changes can occur in the hay, lessening its value and usability as animal feed.

Physical changes in the hay are more prevalent in large bales and stacks than in smaller bales. The physical changes are often due to the large weight of the bales or stacks. The outer and lower layers of these heavy hay bales and haystacks can become loose, causing large amounts of hay to fall from the bale or stack during transportation. The losses are often between 8 and 30 percent of the bale, and on occasion even greater. This not only causes inconvenience and financial loss, but in some instances it can be hazardous. For example a transported stack of hay, when carried over a highway, may drop as much as 30 percent of its weight onto the road, forming an obstruction.

Another way in which portions of hay material may be lost is due to weather, for example high winds or heavy rains. Also extensive shock or vibration during transport can cause substantial losses from even tightly stacked piles of material.

In the past these physical changes have been less of a problem, due to the smaller size of the hay bales. Smaller hay bales may be tightly bound with baling wire, and are therefore less likely to undergo the above-described loss. Thus, until relatively recently, there has been less need to control this problem.

Chemical changes in the hay, generally deterioration and rot leading to nutritutional losses, occur in part due to moisture in the hay and also microbial action within the bales or stacks. The moisture may enter the hay as a result of rains and the like. Very large hay bales or stacks may be particularly slow to dry, and be particularly hard to keep dry, especially when frequent exposure to rain occurs.

Microbial action has long been recognized as a source of problems in freshly cut materials, especially hay. Most of the losses due to microbial action occur within the first few days or weeks of the baling or stacking. The microbial action produces high temperatures within the bales, leading to the nutritional loss prior to a complete drying of the hay.

In the past different approaches have been taken in attempts to solve each of the above problems, and no single unified solution has been achieved. With respect to microbial action, generally anti-microbial materials have been added to cut agricultural material. For example preservatives have been added to fodder being stored.

With respect to the problem of water due to rains or the like, generally the haystacks or bales, when sun is not necessary, have been covered by waterproof or water resistant coverings, such as plastic tarps or the like, or the material has been stored indoors.

With respect to losses due to loose hay in outer layers of the stacks or bales, past solutions have generally involved the use of baling wire, cord or the like to tie the bale or stack together. Of course with very large stacks or bales this can be difficult to manage.

Thus, no satisfactory, unified approach to the problem has yet been developed. The multiplicity of activity required by the approaches listed above may not only be relatively expensive and inconvenient, but also may require substantial expenditure of time on the part of farmers during a period of the growing season in which time is short and valuable. Further, in some instances the solutions have been less than effective. For example, covering hay with a tarp can prevent the sun and air from getting to the hay, leading to ineffective drying. It has already been mentioned that for large haystacks and large bales binding with baling wire, cord or the like can be ineffective, especially unless large amounts of wire or cord are used.

OBJECTS OF THE INVENTION

Therefore the objects of the present invention are: to provide a method of preserving cut agricultural products and silage; to provide such a method especially suited for the preservation of hay; to provide a method of treatment of a haystack or hay bale to inhibit the retention of moisture therein; to provide a method of treatment of a haystack or hay bale to inhibit microbial action; to provide a method of treatment of a haystack or hay bale by application of a chemical composition, to retard the retention of moisture and also to retard microbial action; to provide such a method which includes treatment of the haystack or hay bale with an adhesive to cause outer layers of the haystack or hay bale to become adhered together, reducing loss due to weather, travel or the like; to provide a chemical composition for application to cut agricultural materials in order to achieve the application of an adhesive to outer portions of the cut material to retain same together, while at the same time treating the harvested material to generate a substantial tendency to repel water and minimize microbial action; to provide such a composition especially suited for treatment of haystacks and hay bales; to provide such a composition which is generally readily acceptable to livestock that are likely to feed on the harvested material; to provide such a method and composition which may involve treatment with materials generally regarded as safe for application to feed materials for livestock involved in the human food cycle; to provide such a method which is relatively easy to effect; to provide a composition for use in such a method which is relatively easy to manufacture and apply; to provide such a composition which is relatively inexpensive to produce and which can be produced from readily available materials; to provide such a composition which is particularly well adapted for the proposed usages thereof; and, to provide such a method which is particularly well adapted for use in a variety of types of farming.

Other objects and advantages of this invention will become apparent from the following descriptions wherein are set forth by way of illustration and example certain embodiments of this invention.

DESCRIPTION OF THE INVENTION

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but rather merely as a basis for the claims and as a representative basis for teaching one skilled in the art to variously employ the present invention in virtually any appropriate manner.

The basic methods proposed in this invention call for application, to the exterior layers of hay bales and stacks, or bales and stacks of other agricultural materials and products such as common silage, of coating materials capable of protecting the physical integrity of the bales and stacks and/or inhibiting unfavorable nutritional changes due to moisture and microbial action. The preferred coatings are prepared from agents that are generally considered nutritionally and toxicologically safe for the animals being fed. Thus, many of the compositions described herein are made with food additives or chemicals generally regarded as safe, that is GRAS materials.

Generally, the coatings are emulsions, mucilages or suspensions prepared so that they may be applied by spraying or other surface application to exterior layers of hay bales or stacks in the field, usually shortly after cutting or stacking. While the treatment may occur at a later time, it is preferable to apply it early, to provide the best protection for the hay or other harvested material. In some instances it may be desirable to install spraying or spreading equipment directly in the cutting and/or baling machinery for application immediately after cutting or bale formation.

Two basic types of formulations have been developed for application to cut agricultural products, especially hay, according to the present invention. The first type of formulation is an emulsion which is applied to the surface of individual fibers of hay, to generally coat the hay, creating a somewhat water repellent surface coating. Preferably such compositions include antimicrobial compounds, or preservatives, to inhibit deterioration of the hay. Thus, when the first type of formulation is applied to the haystack, the outer layers of the haystack become generally water repellent and also microbial action is inhibited within the stack.

The second general type of formulation may be generally characterized as an adhesive mucilage. When applied to a haystack or hay bale, the outer layers of the haystack will become bound together, leading to inhibition of breaking apart of the hay bale, that is retention of physical integrity. Further, generally, the adhesive layer will be somewhat water repellent. In addition the preferred adhesive mucilage formulations, according to the present invention, include a preservative or antimicrobial compound to inhibit deterioration and rot.

ADHESIVE COMPOSITIONS

Adhesive materials according to the present invention may be manufactured in two forms. First, they may be made in a somewhat fluid form, for example as a concentrate to be diluted with water prior to spraying on a hay bale. Alternatively, they may be manufactured in a somewhat solid form for storage, the solid to be dissolved in or added to water, prior to application on cut materials such as a haystack or hay bale.

The preferred adhesive formulations according to the present invention have, as their primary active component for adhesive action, casein. Casein is a phosphoprotein generally found in milk, beans and nuts. Other adhesive forming compounds might be used, however casein will generally be preferred since it is readily available and well tolerated in animal feed and the human food cycle. It is also very effective in forming a water-resistant adhesive, under certain circumstances.

Casein is only sparingly soluble in water, and its isoelectric point is around pH 4.7. For ease of handling and effectiveness in formulations according to the present invention, the casein is treated with a base, to substantially form a caseinate salt, preferably sodium caseinate. Also, the casein is used in the presence of an emulsifier or a group of emulsifying agents, to encourage formation of an easily handled suspension, emulsion or solution. Further, a plasticizer may be included to aid in formation of a desired adhesive.

The preferred base for treating the casein, according to the present invention, in part depends upon the nature of the composition being formed. If a somewhat dry powder or cake is desired, then a preferred base has been found to be sodium carbonate, $Na_2CO_3$. While sodium bicarbonate might also be useful, in some trials it has been found that sodium bicarbonate/casein mixtures often form a foam or flock during mixing, which can delay application or cause difficulty in handling.

On the other hand, if the compounds are being mixed together in solution, the preferred base has been found to be diethanolamine. It is recognized, however, that for either situation, that is the solid or the fluid form, a variety of bases might be used. Generally, what is required is that the pH of the final solution be appropriate for keeping the casein and other components from precipitating or forming globules or masses.

It is believed that a variety of emulsifiers or mixtures of emulsifying agents may be used. In particular, emulsifiers of use with the present invention will be those which tend to form oil-in-water emulsions, similar to milk. In this manner the aqueous mixtures of the present formulations will generally not separate and will be easier to apply effectively. Also, they can readily be diluted with water for application, when necessary.

Several general types or classes of emulsifiers have been identified as preferred emulsifiers for the present formulation. The first of these is polyethelene glycol emulsifiers. A well-known and useful such emulsifier is a polyethelene glycol 400 such as that sold under the trade name Carbowax 400 by Union Carbide. The number "400" generally indicates the grade of the polymer and is related to its molecular weight. Such compounds are waxlike solids which dissolve in water to form transparent solutions. They generally do not hydrolyze or deteriorate on storage, and they, generally, do not support mold growth.

An alternate general type of preferred emulsifier or emulsifying agent for the present invention is a polyacrylamide polymer. Many such compounds are known, several known ones being sold under the trade names Carbopol 934-P (Dow Chemical) and Separan NA-202 (Dow Chemical). Such compounds are generally water soluble resins which have very good suspending, thickening and gel forming properties. Separan NP-202 is, presently, probably the more preferred of the two compounds for use in the human food cycle, due to its apparent greater acceptance by the Food and Drug Administration.

It is also believed that numerous types of plasticizers might be used with adhesive mucilages according to the present invention. A preferred plasticizer have been determined to be glyceryl triacetate (triacetin), a known food additive, plasticizer and solvent.

Another emulsion stabilizer which might be used in formulations according to the present invention is carboxymethylcellulose. Generally, in the compositions used, the carboxymethylcellulose will be in the form of a salt. In most formulations according to the present invention, the presence of base will generate formation of sodium carboxymethylcellulose.

As indicated above preferred formulations according to the present invention also include a preservative or preserving agent to inhibit microbial action. While these are not required for the preparation of a good adhesive emulsion or mucilage, such a compound will generally increase the effectiveness of the composition as a hay preservative. A number of agents are well known. However, preferred ones according to the present invention are propionic acid or propionic acid salts. It has been found that propionic acid itself is generally preferred, as it does not appear to inhibit formation of the desired mucilage or emulsion. Alternate preservatives may include such compounds as calcium propionate, sodium propionate, and potassium sorbate.

ADHESIVE FORMULATION 1

The following is a preferred adhesive formulation according to the present invention. The percent compositions are by weight, the unlisted component being water.
  5–10% casein (edible)
  0.5 to 1.0% diethanolamine
  0.25 to 0.5% sodium carboxymethylcellulose
  0.25 to 0.5% triacetin (glycerol triacetate)
  0.5 to 1.5% polyethelene glycol 400 (for example Carbowax 400)
  0.1 to 0.4% propionic acid (food grade)

The above formulation is a viscous mucilage, and requires substantial pressure for application. For field use hand pumps or mechanical pumps might be used. The coating is to be sprayed or otherwise spread onto the outer surface of the bales or stacks in quantities sufficient to cover the entire outer surface of the hay, or other material being coated. The coating should generally be applied in sufficient amount for penetration of from one to three inches. Preferably from about 1,500 to 3,000 milliliters (ml) of such a coating should be applied for the protection and stabilization of a bale or stack including about 1,200 to 1,500 pounds of material. The amount of coating to be applied varying, proportionally, with concentration and with amount of cut material to be coated.

It has been found that the nature of and order of steps taken in the mixing of the components can make a considerable difference in the ease with which the mucilage or adhesive formulation can be formed. If appropriate care is not taken, separation of the mixtures may occur, or some components may settle or agglomerate. The following examples report preferred preparations of adhesive formulations generally according to Formulation 1 given above. In several instances some modifications in components were made, these are mentioned where appropriate.

EXPERIMENT 1

A first solution (Solution A) was prepared including 36 grams (gm) of casein slurried in about 197 ml of deionized $H_2O$ at about 60 degrees centigrade (° C.). To this slurry was added about 3.0 ml of diethanolamine, with continuous stirring at about 60° C. The pH of this mixture was about 7.2 to 7.3, and the mixture was allowed to stand for about 30 minutes at 60° C..

A second solution (Solution B) was prepared from the addition of about 1.0 gm of sodium carboxymethylcellulose to 195 ml of deionized $H_2O$, at room temperature. To this mixture was added about 2.0 ml of triacetin and about 2.0 ml of Carbowax 400, slowly and with stirring. This resulted in the formation of a thick, nearly water-clear, viscous solution having a pH of approximately 7.2.

Solution B was added to Solution A with constant stirring, to yield a viscous mucilage. To this was added, very slowly, about 1.2 ml of propionic acid, to yield a solution having a final pH of about 6.2 to 6.3. It was found that the propionic acid addition must be done very slowly, otherwise sometimes the solution will cease to maintain an even consistency, as for example by formation of globules or masses therein.

Immediately upon formation, the above mucilage was observed to have some foam formed therein, which tended to break after standing for about one hour. The final concentrations, by weight, of the components used in forming the mixture, other than water, were as follows:
  About 9.0% casein
  About 0.75% diethanolamine
  About 0.5% triacetin
  About 0.5% Carbowax 400 (a polyethelene glycol compound);
  About 0.3% propionic acid; and
  About 0.25% sodium carboxymethylcellulose.

The above composition was tested by application to test hay bales. The test hay bales used were approximately 4 inches by 15 inches by 20 inches. Each of two bales was treated with about 75 ml of the above-referenced mucilage by pouring the mucilage onto the bale, and spreading it thereover. By about one hour after application the bales were essentially dry and the outermost hay fibers were very tightly adhered to one another. The test bales were exposed to water spraying for about 1½ hours, an equivalent to about a 1.0 to 1.5 inch rain. Within about several hours the bales had dried and were resprayed with water for another 1.5 hours, again approximating a 1.0 to 1.5 inch rainstorm. After the bales had dried they were examined. The outer portions of the bales were very tightly adhered, and no loose fibers were observed to fall off of the bales.

The above-treated bales were placed in a feeding trough for cattle. Almost immediately after the bales were placed in the feeding trough, several cattle ate the majority of the treated and also control bales. There did not appear to be any preference for the cattle between treated and untreated bales, and the treated bales were entirely consumed.

EXPERIMENT 2

A first solution (Solution C) was made by mixing 40.0 gm of casein and approximately 197 ml of deionized H$_2$O, at 50° to 60 °C., to form a slurry. To this was added about 3.0 ml of diethanolamine, to dissolve the casein and form the mucilage. The pH of this mucilage was about 6.8 to 7.0.

A second solution (Solution D) was formed by mixing approximately 1 gm of sodium carboxymethylcellulose with 196 ml of deionized H$_2$O, at room temperature, to form a solution. To this was added about 2.0 ml of triacetin and about 2.0 ml of Carbowax 400.

Solution D was added to Solution C with continuous stirring, to form an overall mixture having a pH of approximately 7.0. The total volume of the mixture was about 400 ml.

150 ml of the above mixture of solutions C and D was separated and to this was added approximately 0.45 ml of propionic acid. The addition was fairly rapid and resulted in the formation of some clabber, that is white globs of clotted material. The clabber slowly went into suspension, upon shaking by hand. The pH of the final mixture was tested to be approximately 6.0.

The composition of the final solution, by weight, was as follows:
About 10% casein;
About 0.75% diethanolamine;
About 0.25% sodium carboxymethylcellulose;
About 0.5% triacetin (glyceryl triacetate);
About 0.5% Carbowax 400; and
About 0.3% propionic acid.

The above formulation was tested on a bale of hay having dimensions of about 4"×15"×20". The bale was treated with about 75 to 100 ml of the mixture, by spreading or pouring thereon, to completely cover the bale. The bale was allowed to dry at a temperature of about 85 to 90 degrees fahrenheit (° F). After about 1 hour the bale was found to be essentially dry and brittle, with the outer layers of hay substantially adhered thereto.

The bale was set outside and exposed to heavy dews on each of four nights. The bale was then exposed to heavy lawn spray for about 1.5 hours, approximating about a 1.0 to 1.5 inch rainfall. A second exposure to heavy spraying, roughly equivalent to a 1.0 to 1.5 inch rainfall was made. The bale was then allowed to dry.

The bale was found to have those hay fibers in the outer 1.0–1.5 inches tightly adhered to one another. The inside fibers of the bale were very green compared to the outer bale fibers and also a control, untreated bale. The outer fibers were found to be well coated, as well as adhered, by the polymer coating.

EXPERIMENT 3

A variation in Formulation 1 was made utilizing calcium propionate, rather than propionic acid, as the preservative or preserving agent. The composition was made as follows:

A first solution (Solution E) was made from mixing 32 gm of casein and 197 ml of deionized H$_2$O, at 50° to 60° C., to form a slurry. To this was added about 3.0 ml of diethanolamine, with continuous stirring, to yield a yellow-gray heavy mucilage. It is noted that the volume of the solution swelled considerably during addition of the diethanolamine. The final solution had a pH of about 7.5.

A second solution (Solution F) was made by mixing about 1.0 gm of sodium carboxymethylcellulose with about 197 ml of deionized H$_2$O, at room temperature. To this was added about 2.0 ml of triacetin; about 2.0 ml of Carbowax 400; and about 1.2 gm of calcium propionate. This yielded a mixture which was slightly opaque and had a pH of approximately 6.5.

Solution F was added to Solution E with continuous stirring, to form a yellow-gray mucilage having a pH of about 8.0. The mucilage was very thick and had a total volume of about 400 ml.

The final composition of this mixture, by weight, was as follows (the remaining component being primarily water):
About 8.0% casein;
About 0.75% diethanolamine;
About 0.25% sodium carboxymethylcellulose;
About 0.5% triacetin (glycerol triacetate);
About 0.5% Carbowax 400; and
About 0.3% calcium propionate.

An experimental hay bale having dimensions of about 4"×15"×20" was treated with about 75 to 100 ml of the above-referenced mixture and was placed outdoors to be dried. After drying the bale was exposed to a heavy spray for approximately 1.5 hours, to approximate a 1.5" rainfall. The bale was allowed to stand overnight to dry, and then was again sprayed with water for about 1.5 hours to approximate a second 1.5 inch rainfall. Several days later the bale was exposed to light intermittent rainfall over a number of hours, totaling approximately 1.5". Also, over several more days the bale was exposed to heavy mist and dew. Finally, the bale was exposed to a 2.5 inch rainfall over a couple of hours. The bale was then examined.

The bale was observed to have its outer layers, for approximately 1.0 inch deep, tightly adhered and brittle, however the adhered fibers could be pulled apart from one another by hand. Individual fibers were observed to be well coated with the compound.

EXPERIMENT 4

Another variation in a Formulation 1 mixture, this time utilizing sodium propionate as the preservative, was tested. The composition was prepared as follows:

A first solution (Solution G) was prepared by mixing approximately 18 gm of casein with about 98.5 ml of deionized water, at approximately 60° C., to form a slurry. The slurry was allowed to stand, at 60° C., for about 20 minutes. To this was added about 1.5 ml of diethanolamine, with constant stirring, at still about 60° C..

A second solution (Solution H) was prepared by mixing approximately 0.5 gm of sodium carboxymethylcellulose with about 98.0 ml of deionized H$_2$O, to form a slurry. To this was added about 1.0 ml of triacetin, with stirring, and about 1.0 ml of Carbowax 400, with stirring.

Solution H was added to Solution G with continuous stirring, forming an overall mixture having a pH of about 8.0. To this was added about 0.6 grams of sodium propionate, slowly and with continuous stirring. The final mixture was a heavy mucilage having a pH of approximately 8.0 and the following composition of added ingredients, by weight, the remainder being primarily water:
About 9.0% casein;
About 0.75% diethanolamine;
About 0.25% sodium carboxymethylcellulose;

About 0.5% triacetin (glyceryl triacetate);
About 0.5% Carbowax 400; and
About 0.3% sodium propionate.

The above mixture was tested on two hay bales each having measurements of about 4"×15"×20". About 75 ml of the mixture were added to each bale and spread thereover. The bales were allowed to dry, over a time period of about one to two hours. The bales were then exposed to outdoor weather conditions, on a September day having a high of about 60° F. and a low during the night of about 35° to 40° F. The next day the bales were sprayed for about 1.0-1.5 hours with water, to approximate a 1.0-1.5 inch rainfall. The bales were allowed to dry overnight and were then again exposed to a 1.5 hour spraying, approximating a second 1.0-1.5 inch rainfall. Over the following two days the bales were exposed to heavy, but intermittent, rainfall amounting to approximately 2.4 inches. The bales were then allowed to dry for several days, being exposed to intermittent, gentle rains. Approximately 12 days later the bales were exposed to a very heavy rainfall of about five inches, and then were exposed to a lighter rainfall, over several more days, of about 0.5 to 1.0 inch. The bales were then examined.

Each bale was observed to have an outer layer of fibers which were well adhered to the bale but which could be pulled apart manually. Substantially all outer fibers of the bales were observed to be brittle and coated with material. A slight amount of moisture was found in the inner portion of the bales, and the bales were somewhat greener than a controlled, untreated, bale that had been exposed to the same testing.

ALTERNATE ADHESIVE MUCILAGE: FORMULATION 2

As indicated above, alternate formulations using: different emulsifying agents and thickening agents; and propionic acid salts or similar antibacterial agents, are possible according to the present invention. A particularly good alternative to Formulation 1-type mixtures is as follows, the composition being given by weight and the remainder being primarily water:
  About 6 to 10% casein (edible);
  About 0.5 to 1.2% diethanolamine;
  About 0.052 to 0.2% of a polyacrylamide emulsifying agent (for example Carbopol 934-P);
  About 0.2 to 0.4% propionic acid (food grade).

Generally Formulation 2 compositions should be used similarly to Formulation 1 compositions, that is by the addition of approximately 1,500 to 3,000 ml of coating for the protection and stabilization of about 1,200 to 1,500 pound stacks or bales of hay. The amount of solution should be modified, proportionately, for different sized haystacks or bales, and different concentrations of mixtures. It is noted that other polyacrylamide emulsifiers, such as Separan NP-202 may be substituted for Carbopol 934-P. Generally, a sufficient amount of emulsifier should be added to yield the desired consistency, with the above suggested concentration being preferred for Carbopol 934-P.

Again, it is believed that the order and method of mixing of the components are important in yielding a mucilage that is free flowing and relatively free from any clotted matter or separation. The following experiments exemplify preparation and use of Formulation 2 type compositions.

EXPERIMENT 5

A composition of material according to Formulation 2 was prepared as follows:

About 36 gm of casein was added to about 396 ml of deionized $H_2O$ at about 60° C., with constant stirring. A slurry was formed which was allowed to sit for several minutes.

About 3.0 ml of diethanolamine were added to the slurry, with constant stirring, again at about 60° C. The resulting mixture had a pH of about 7.6 to 7.8 and was allowed to stand for about 30 minutes.

About 0.4 gm of Carbopol 934-P were added to the casein mixture, very slowly, resulting in a mixture having a pH of about 7.4 to 7.5. To this was slowly added about 1.2 ml of propionic acid, giving a resulting mixture having a pH of about 6.0 to 6.2.

The resulting mixture had a total volume of about 400 ml and was a very thick, uniform, yellow-gray mucilage that was mobile, that is, it would flow. The final mixture had the following approximate composition, by weight (the remaining component being primarily water):
  About 9.0% casein;
  About 0.75% diethanolamine;
  About 0.1% Carbopol 934-P; and
  About 0.3% propionic acid.

The above formulation was tested on two hay bales each having dimensions of about 4"×15"×20". Each bale was treated with about 75 ml of the mucilage, which was added by pouring over the bale and spreading thereon.

After about one hour the bales were observed to be dry, and the outer fibers were noted to be very tightly adhered to the bales. The bales were exposed to a spraying of water, for about 1.5 hours, approximating about 1.5" of rainfall. The bales were then allowed to dry for several hours and were resprayed for another 1.5 hours, again approximating a 1.0-1.5 inch rainfall. The bales were then allowed to stand for several days.

Upon examination both bales were found to have the outer fibers very tightly adhered to the bale, with very few loose fibers being observed. The two bales were then placed in a feed trough for cattle, along with other bales of hay. The cattle immediately ate most of the bales, with no apparent preference over control, untreated, bales.

EXPERIMENT 6

An adhesive mucilage composition according to Formulation 2 was prepared as follows:

About 16 gm of casein were mixed with 197 ml of deionized $H_2O$, at approximately 60° C., to form a slurry. To the slurry was added about 2.0 ml of diethanolamine, slowly, with continuous stirring. This mixture was allowed to stand for about 30 minutes and was observed to have a pH of about 8.5.

About 0.2 gm of Carbopol 934-P were very slowly added to the above mixture, to form an off-white, thick, mucilage. The pH of this resulting mucilage was about 8.2 to 8.3.

Next about 0.6 ml propionic acid were added very slowly to the mixture. The resulting mixture was a very thick heavy mucilage that was mobile. The pH of the mucilage was observed to be about 7.8 to about 8.0. Some foam was observed, which disappeared upon standing.

By weight, the composition of this formulation, in terms of added components, was as follows (the remainder being primarily $H_2O$):

About 8.0% casein;
About 1.0% diethanolamine;
About 0.1% Carbopol 934-P; and
About 0.3% propionic acid.

Two test bales, each having a dimension of about 4"×15"×20", were each treated with about 75 ml of the above mixture. The bales were allowed to stand and dry overnight. They were then sprayed with water from a hose for about 1.5 hours, approximating a 1.0–1.5 inch rainfall. The bales were again allowed to dry overnight, and then were exposed to a 1 inch rainfall over several hours.

Upon final evaluation the hay bales were observed to be well coated on all of the outer fibers, with the outer fibers being fairly well adhered to the bale. The insides of the bales were observed to be relatively dry.

EXPERIMENT 7

A modification in a Formulation 2 type adhesive mucilage was prepared as follows:

About 18 gm of casein were mixed with about 198.5 ml of deionized $H_2O$ at about 60° C. To the resulting slurry about 1.5 ml of diethanolamine were added, with constant stirring. The pH of the resulting mixture was about 8.2 to 8.3.

To the above mixture were added about 0.2 grams of Carbopol 934-P, with constant stirring, to form a slurry having a pH of about 8.0.

To the resulting mixture was added about 0.6 gm of sodium propionate, very slowly with constant stirring. The resulting mucilage had a pH of about 7.5 to 7.6, was observed to be apparently uniform in consistency and was very heavy, but mobile. The resulting mixture had been formed from the following components, by weight (the remaining constituent being water):

About 9.0% casein;
About 0.75% diethanolamine;
About 0.1% Carbopol 934-P; and
About 0.3% sodium propionate.

The above composition was tested on two hay bales each having dimensions of about 4"×15"×20". Each bale was treated with about 75 ml of the composition, by pouring the composition thereon and spreading thereover. The bales were observed to be dry after about one to two hours. They were then allowed to stand overnight.

Both of the bales were sprayed with water for about 1.5 hours, approximating a 1.0–1.5 inch rainfall. They were then allowed to stand overnight and were again sprayed for about 1.5 hours, to approximate a second 1.0–1.5 inch rainfall. The bales were again allowed to stand overnight.

Over the next two days, the bales were exposed to a heavy, but intermittent, rainfall totaling about 2.4 inches of rain. The bales were then allowed to stand for about three days, and on the fourth day they were exposed to about a 0.6 inch rainfall. The bales were allowed to stand about five more days, after which they were exposed to about a 4.7 inch rainfall, that was very heavy and which occurred over a period of about two days. The bales were then allowed to stand for several more days, and were exposed to about 0.7 inches of a light, intermittent, rainfall. The bales were then examined.

The bales were both observed to have their outer fibers fairly well adhered to the bale, and difficult to separate. The hay fibers were observed to be brittle and well coated with the adhesive. Inside portions of the bales were fairly dry and green, relative to an untreated but similarly exposed control.

ALTERNATE ADHESIVE: FORMULATION 3 FOR DRY MIX COMPOSITIONS

Under certain circumstances it may be desirable to have the adhesive formulation available in a dry mix form. That is, the above formulations, Formulations 1 and 2, are generally heavy, viscous but fluid, mucilages. It is foreseen that a dry mix, to be diluted with water for use, would be, in many instances, easier to handle and store. Generally, preferred components of such a dry mix are as follows:

casein;
sodium carbonate;
a polyacrylamide polymeric emulsifier (for example Carbopol 934-P or Separan NP-202); and
potassium sorbate (food grade).

It is noted that some substitutions may be made, for example, it is foreseen that sodium propionate might be substituted for potassium sorbate as the preservative.

Preferably, the dry mix is prepared in such a manner that when mixed with water, the resulting hay treatment composition will have the following composition of constituents, by weight (the remainder being substantially water):

About 4 to 10% casein;
About 1 to 3% sodium carbonate monohydrate;
About 0.1 to about 0.4% potassium sorbate; and
About 0.05 to 0.3% polyacrylamide polymer (Carbopol 934-P or Separan NP-202, for example).

A preferred dry mix powder for yielding the above hay treatment includes the following components, by weight:

About 78.74% casein (food grade);
About 18.2% sodium carbonate monohydrate;
About 2.62% potassium sorbate (food grade); and
About 0.44% polyacrylamide polymer (for example Carbopol 934-P or Separan NP-202).

It is noted that anhydrous sodium carbonate could readily be substituted for the monohydrate.

During the mixing with water, part or all of the casein is converted to sodium caseinate and, if acidic, the polyacrylamide polymer is converted to its sodium salt. The resulting spray is preferably used in quantities of about 1,500 to 3,000 ml of spray per 1,200 to 1,500 pounds of hay, with the amount of spray being varied, proportionately, with the amount of hay.

A particular problem with developing a dry mix has been that the mix must be such that it can be readily mixed with water, by the farmer and preferably by hand, to form a stable mucilage. In some instances it will be preferred to use hot tap water, in order to lessen the length of time taken for mixing.

The following Experiments relate to adhesive formulation, generally according to Formulation 3 type compositions.

EXPERIMENT 8

A composition generally according to Formulation 3 was prepared as follows:

The following dry ingredients were molded together:
18 grams of casein;
3.5 grams of $Na_2CO_3$ (anhydrous);
0.1 grams of Carbopol 934-P; and
0.6 grams of potassium sorbate.

It is noted that anhydrous sodium carbonate was used, however, the hydrous form could have been used just as readily, preferably with accounting for the weight of water.

The dry mixture was prepared for application to hay as follows:

200 ml of room temperature tap water were added to the dry ingredients, with hand stirring and shaking. It took approximately one hour for complete reaction, to form a yellow, very heavy but quite mobile, mucilage, having a pH of about 9.2. The final composition of the solution, by weight, was as follows (the remaining ingredient being tap water):

About 9% casein;
About 1.75% $Na_2CO_3$;
About 0.05% Carbopol 934-P; and
About 0.3% potassium sorbate.

The mucilage was tested as follows:

Two hay bales were prepared each having dimensions of about 4"×15"×20". Each bale was treated with about 50 to 75 ml of the above mucilage, by pouring and spreading the mucilage over the entire outside of the bales. The bales were allowed to dry at a temperature of about 50 to 60 degrees fahrenheit. A 1.5 hour drying period was used.

Shortly after drying, the bales were exposed to about 0.7 inches of light intermittent rain. Several days later the bales were exposed to a fairly heavy frost, and then they were exposed to a spray of water approximating a 1.5 inch rainfall. On the next day the bales were exposed to a further 0.6 inch light intermittent rain, leading to a total exposure of the bales being about 2.8 inches of rain or equivalent.

The bales were examined, each was substantially identical to the other. A very good adhesiveness in the hay fibers was noticed on the outer portions of the bales, extending to about 1.0 inch inwardly. The inside fibers of the bales appeared green. The adhesion was very tight, and the fibers were nearly impossible to separate from one another, as by pulling.

The treated hay bales were fed to cattle and no problems were observed.

EXPERIMENT 9

A powdered composition was prepared by mixing the following together:

360.0 grams of casein;
70.0 grams of $Na_2CO_3$ (anhydrous);
12.0 grams of potassium sorbate; and
2.0 grams of Carbopol 934-P.

The powders were molded together in a plastic container. The dry powder mix was prepared for application as follows:

Approximately 111 grams of the dry powder mix was placed in a one-half gallon plastic container and about 1,000 ml of room temperature tap water were added. The mixture was stirred for approximately 3 hours to completely suspend the powder.

The adhesive composition was tested as follows:

A plate of glass was covered with plastic and sufficient milo was piled on it to form a pile approximately 8"×12" by 1.5-2" in height. Generally, the pile peaked in the center and sloped toward the edges, with the approximate volume of milo being 90 to 100 cubic inches.

Approximately 100 to 125 ml of the adhesive solution was poured onto the milo pile. The milo was allowed to dry at room temperature overnight.

Some excess mucilage was observed to have moved to the edges of the milo. The pile of milo was observed to be stiff and it appeared to be completely bound, that is no substantial loose milo was observed.

The treated milo was placed outdoors and within one hour birds had eaten most of the milo. Thus, the treated milo was not rejected as feed, at least for birds.

Another test was made, with precautions taken to avoid eating of the milo by birds.

A stack of milo of approximately 8"×12"×1.5" in the center was placed on a plastic covered glass plate. The pile was sprayed with sufficient adhesive solution to appear completely covered. The milo was allowed to dry.

The stack of milo was sprayed for about 1.0-1.5 hours with water, creating an equivalent to about 1 inch of rainfall. The pile was allowed to dry overnight, at about 60° to 65° F.

The treated milo pile was observed to still have an adhesive coating, and was fairly rigid, that is fairly free from loose milo material.

The milo stack was again sprayed for one hour with sufficient water to approximate about 1.0 inch of rainfall, and was again allowed to dry at about 60° to 75° F., overnight. The milo pile was then exposed to a sporadic light rain totaling approximately 0.1 inches, followed by a heavy frost. The stack of milo was observed to be still substantially coated with adhesive. The milo was relatively difficult to separate, when compared to non-coated milo that had been exposed to the same conditions. The coated milo was somewhat darker in color than uncoated control milo.

EXPERIMENT 10

Sodium caseinate is a commercially available material. The following experiment was run to show that sodium caseinate could be substituted for casein in the dry mixture.

The following dry mixture was formed
18.0 grams of sodium caseinate;
About 2.0 grams of sodium carbonate;
About 0.6 grams of potassium sorbate; and
About 0.1 grams of Carbopol 934-P.

It is noted that if no base, such as sodium carbonate, is used the dry mix will not dissolve well, that is, it tends to curdle.

An adhesive solution was made by the addition of 200 ml of room temperature tap water to the dry powder, with stirring and shaking. Initially some curds formed. However, eventually there was substantially complete solubilization of the sodium caseinate, to form a highly viscous but mobile, opaque, mucilage, having a slight yellow color. The pH of the mucilage was observed to be about 9.5.

EXPERIMENT 11

The preserving agent or preservative utilized in the adhesive mucilage may be varied. For example sodium propionate may be substituted for the potassium sorbate. In order to demonstrate this the instant experiment was conducted.

A dry mix was made from the following components:
About 9.0 gm casein;
About 2.0 gm $Na_2CO_3$;
About 0.3 gm sodium propionate; and
About 0.1 gm Carbopol 934-P.

The entire dry mix was added to about 100 ml of room temperature tap water, by slowly slurrying in the powder with the mixture. The result was a fluffy white mucilage having a volume of about 350 ml due to foaming. The pH of the mucilage was observed to be about 8.5 to 9.0. It is noted that the rate of mixture with water can be increased substantially by using warm or hot tap water. Upon standing, the mucilage eventually separated from the foam, yielding a fairly mobile compound having the following composition, by weight (the remaining constituent being tap water):

About 9.0% casein;
About 2.0% sodium carbonate;
About 0.1% Carbopol 934-P; and
About 0.3% sodium propionate.

The above adhesive solution was tested as follows:

Two hay bales having dimensions of approximately 4"×15"×20" were each treated with about 50 to 75 ml of the above adhesive solution, by pouring and spreading the mucilage onto and completely over each bale. The bales were placed outdoors to dry at about 50° F. The bales were observed to be dry after about 1.5–2.0 hours.

The bales were exposed to heavy, but intermittent, rain, with outdoor temperatures of between 40° and 45° F. The total amount of rain was about 2.4 inches over several days. The bales were also exposed to a rather heavy frost, after the period of rain.

After several days the bales were exposed to about 0.6 inches more of rain. Approximately a half week later the bales were exposed to about 4.7 inches of rain, which was often very heavy. Several days following the last heavy rain, the bales were exposed to two periods of light rain, each of which totaled about 0.7 inches.

One of the bales was opened and examined. A good adhesive layer of bound together hay fibers was observed in about the outer 1.0 inch layer of the bale. The inside of the bale was relatively dry and had a green hay color, when compared to an uncoated control. Substantial pulling was necessary to get the bale to break apart.

EXPERIMENT 12

To demonstrate that an effective, less concentrated, adhesive mucilage can be prepared, the instant experiment was conducted. The general purpose was to show that a less heavy, and more fluid, mucilage composition is usable. It is noted that such a solution, while easier to spread, may need to be used in higher amounts on hay to be treated.

The following dry mix was prepared:
About 18.0 grams casein;
About 4.0 grams sodium carbonate (anhydrous);
About 0.6 grams sodium propionate; and
About 0.2 grams of Carbopol 934-P.

The above components were molded into a uniform dry mix. The powder was dissolved in about 400 ml of room temperature tap water. This was done by first adding about 200 ml of water to slurry the dry mix, with hand stirring. Then an additional 200 ml of water was added to dilute the mixture. It is noted that the Carbopol 934-P was the last material to go into the solution, but eventually it all dissolved with a total solution time being about one hour.

The resulting solution was observed to have a pH of about 9.2 to 9.3. It was a very mobile but fairly thick mucilage having a slightly yellow color. The composition of starting materials in the solution, by weight, was as follows (the remaining constituent being substantially water):

About 4.5% casein;
About 1.0% sodium carbonate;
About 0.15% sodium propionate; and
About 0.05% Carbopol 934-P.

A test hay bale having dimensions of about 4"×15"×20" was prepared and treated with 150 ml of the above solution. The treatment was by pouring and spreading over the surface of the bale. The bale was allowed to dry at about 45° to 50° F.

The bale was then exposed to about 4.7 inches of rainfall over a two day period, often the rainfall being very hard. On several days following the heavy rains, the bale was exposed to a total of about 1.4 inches of rain and finally a heavy frost.

Upon evaluation the bale showed a very good adhesiveness with nearly all outer fibers of the bale being very tightly adhered, some of the fibers being very difficult to separate from the bale. The inside portion of the bale was found to be dry and to possess a green hay color.

EXPERIMENT 13

As indicated above, at least one base that might be substituted for sodium carbonate in forming the dry mix is sodium bicarbonate. An experiment demonstrating this was conducted as follows:

A dry mix having the following composition was prepared:
About 18.0 grams casein;
About 5.0 grams sodium bicarbonate (anhydrous);
About 0.6 grams sodium propionate; and
About 0.2 grams Carbopol 934-P.

The above dry mix was dissolved in about 200 ml of room temperature tap water, with hand shaking. There was considerable gas (carbon dioxide) evolution and about 2.5 hours were required to bring about solution and preparation of the mucilage. The mucilage prepared was found to have a pH of about 7.0 to 7.1. It was thick but mobile and had a slightly yellow color. The composition of starting materials in the mixture, by weight, was as follows (the remaining constituent being primarily water):

About 9.0% casein;
About 2.5% sodium bicarbonate;
About 0.3% sodium propionate; and
About 0.1% Carbopol 934-P.

The above-referenced solution was tested as follows:

Two hay bales having dimensions of about 4"×15"×20" were prepared. Each was treated with about 50 to 75 ml of the above adhesive, by pouring and spreading of the mucilage over the bale. The bales were then allowed to dry and were exposed, over about a five day period, to rain or hose spray totaling to an equivalent of about 3.5 inches of rainfall. Further, a fairly heavy frost occurred during the test period.

The hay bales were examined and were observed to have a very good adhesiveness in the outer fibers; nearly all of the outer fibers being very difficult to separate from the bale. The inside of the bales exhibited a green hay color. It was observed that most of the adhesiveness was in about the outer 1.0 inch of the hay bales.

EMULSION COATINGS FORMULATION 4 COMPOSITIONS

It is foreseen that in some instances it may be desirable to utilize very good coating for the outer fibers of the hay bale, without the tight adhesiveness provided by the Formulation 1, 2 and 3 type compositions. These compositions might be used, for example, where it is not believed that the haystack or hay bale will be subject to those physical stresses likely to cause breaking apart of the hay, or further they might be used where it is intended that the hay break apart readily, but where it is also desired that for a period of time outer portions of the haystack or hay bale still be kept coated with a somewhat moisture resistant and antimicrobial coating.

For commercial purposes, generally such an emulsion coating would preferably be prepared in a concentrated form, to be diluted before spraying onto a haystack or hay bale. Such coatings are generally substantially less viscous than adhesive coatings, and therefore could be more easily sprayed upon haystacks or hay bales, especially utilizing conventional spraying equipment. Thus, another reason why such coatings might be preferred would be due to the ease with which they can be sprayed upon hay or other materials.

Generally, emulsion coatings according to the present invention include at least the following types of constituents:

A principal component is an edible oil, which will help form the water resistant coating over the harvested material, in particular the hay bale fibers. Peanut oil and/or soybean oil will be generally preferred, since they are both readily available, edible and can be used to form effective coatings. Of the two, soybean oil is preferred.

In such a coating numerous emulsifiers and mixtures of emulsifying agents may be used to assist in maintaining a mixture of even consistency that can be readily sprayed. Also, such compounds will help in setting up the desired coating. In defining the present invention it was found that a mixture of the following types of compounds appeared to yield a preferred composition, over the use of the compounds individually. The preferred emulsifying agents included: acetylated monoglycerides, for example the acetylated monoglyceride composition generally sold under the trade name Myvacet 9–45 (Eastman Chemical); polyethelene glycol-8-oleate compositions such as those sold under the trade name Witconol H31A (Witco Chemical Co.); and polyacrylamide compositions such as those generally sold under the trade names Carbopol 934-P and Separan NP-202 (Dow Chemical).

Other preferred constituents for such emulsion coatings include a preservative, such as propionic acid, a propionic acid salt, or a similar type of preservative; a plasticizer/solvent such as glyceryl triacetate (triacetin); and a base such as diethanolamine.

The following is a preferred composition, by weight, for an emulsion coating to be used on freshly harvested materials such as hay bales and haystacks. The formulation is for a concentrate, which generally would be diluted with about four volumes of tap water before field application. The constituent not listed is water. The general Formulation 4 (concentrate) composition is as follows:

About 16 to 20% soybean oil (edible);
About 16 to 20% Myvacet 9–45 (acetylated monoglycerides);
About 1.0 to 1.5% diethanolamine;
About 1.0 to 1.5% Witconol H31A (polyethylene glycol-8-oleate compounds)
About 1.0 to 2.0% triacetin (glyceryl triacetate);
About 0.25 to 1.0% Carbopol 934-P (polyacrylamide resin); and
About 0.5 to 2.00% propionic acid (food grade).

As with Formulation 1, Formulation 2 and Formulation 3 compounds, generally Formulation 4 compounds, once appropriately diluted, should be applied in a volume of about 1,500 to 3,000 ml of coating per 1,200 to 1,500 pounds of hay, with the amount of coating to be used changing proportionally with the amount of hay to be sprayed. Due to their less viscous nature, Formulation 4 type coatings may be readily sprayed with ordinary paint spraying equipment or similar equipment, when used in the dilution appropriate for field application.

It is noted that in preparing emulsions of numerous components, especially those listed above, the temperature of mixing, the order of mixing components, the pH of the solution and other, similar, factors may be very important in preventing precipitation or formation of multiple layers, and in preventing clabber or globule formation and similar problems. The following experiments show preferred methods:

EXPERIMENT 14

A first solution (Solution I) was made by mixing about 3.0 ml of diethanolamine and about 166.5 ml of deionized $H_2O$.

A second solution (Solution J) was prepared by mixing about 60 ml of soybean oil with about 60 ml of Myvacet 9–45.

Solution J was added to Solution I with constant stirring. To this was added about 4.5 ml of Witconol H31A, with constant stirring. Next about 6.0 ml of triacetin were added, also with constant stirring. The resulting solution was a very fluid, off-white, emulsion.

To this solution was added about 1.2 grams of Carbopol 934-P, very slowly, to give a thick, almost immobile, off-white emulsion having a pH of about 7.5.

To the above mixture was added, very slowly, about 4.5 ml of propionic acid. The propionic acid tended to reduce the viscosity of the solution and made the emulsion fairly mobile. The resulting emulsion was very uniform, off-white in color and had an observed pH of about 6.2 to 6.3. The above concentrated solution could be poured slowly, but relatively easily. The final concentration of starting materials of this concentrate was as follows:

About 20% soybean oil;
About 20% Myvacet 9–45;
About 1.0% diethanolamine;
About 1.5% Witconol H31A;
About 2.0% triacetin;
About 1.5% propionic acid; and
About 0.4% Carbopol 934-P.

The above concentrate was tested as a coating for hay as follows:

About 50 ml of the concentrate was diluted with about 200 ml of tap water, to yield a very mobile white emulsion. The emulsion was tested on two test bales each having dimensions of about 4"×15"×20". The bales were treated by spreading and pouring about 75 to 100 ml of the diluted solution thereover.

After about one hour the bales were very nearly dry and had a somewhat shiny/waxy look. The bales were exposed to a water spray for about 1.5 hours, to approximate a 1.0–1.5 inch rainfall. The bales were allowed several hours to dry and were again sprayed for about 1.5 hours, approximating a second 1.0 to 1.5 inch rainfall.

The hay bales were observed to have their external, and many of the internal, fibers well coated with a brown, waxy and shiny coat. Some, but very little, adhesion was noted among the outer fibers.

The bales were placed in a feeding trough for cattle. No discrimination on the part of the cattle between the treated bales and non-treated controls was observed.

EXPERIMENT 15

A somewhat diluted emulsion coating was prepared to show that peanut oil can be substituted, at least in some instances, for soybean oil. The solution was prepared as follows:

A first solution (Solution K) was prepared from 175 ml of deionized $H_2O$ and about 1.0 ml of diethanolamine.

A second solution (Solution L) was prepared from about 10 ml of peanut oil and about 10 ml of Myvacet 9–45.

Solution K was added to Solution L, with constant stirring, in a mixer. The result was a fairly good oil-in-water emulsion having a pH of about 10.0. Some tendency of the emulsion to separate, with time, was noted.

About 1.0 ml of Witconol H31A was added to the solution, with stirring. The result was a good oil-in-water emulsion having a pH of about 9.0.

To the above solution was added about 0.4 gm of Carbopol 934-P. The Carbopol was added slowly by powdering into rapidly stirred emulsion. The result was a very thick, but somewhat stable, mobile, white, oil-in-water emulsion having a pH of about 8.0.

The composition of starting materials in the above mixture, by weight, was as follows (the remaining constituent being water):
  About 5.0% peanut oil;
  About 5.0% Myvacet 9–45;
  About 0.5% Witconol H31A;
  About 0.2% Carbopol 934-P; and
  About 0.5% diethanolamine.

The above solution shall be referred to, in the following description as Solution M.

A fourth solution, Solution N was prepared from about 99 ml of deionized $H_2O$ and about 1 ml of triacetin. The pH of this solution was about 6.0.

Solution N was slowly added to about 100 ml of Solution M, with constant stirring. The result was a mobile, white emulsion having a pH of about 8.2. It was observed that upon standing, the resulting solution tended to separate, but, the emulsion could be maintained with some agitation. Final concentrations of starting components, by weight, in this solution were as follows (the remaining constituent being water):
  About 2.5% peanut oil;
  About 2.5% Myvacet 9–45;
  About 0.25% Witconol H31A;
  About 0.1% Carbopol 934-P;
  About 0.5% triacetin; and
  About 0.25% diethanolamine.

The above emulsion was tested as follows:

A small hay bale having dimensions of about $4''\times15''\times20''$ was sprayed with about 50 to 75 ml of the above solution, with some spreading to ensure complete coverage of the bale. The bale was allowed to dry.

The bale was exposed to water by spraying with a hose for about 1.5 hours, to approximate about a 1.5 inch rainfall. The bale was then allowed to dry.

The dried bale was observed to have its individual fibers substantially coated with a slightly brownish somewhat oily coating. The outer hay particles were observed to be particularly well coated and showed substantial evidence of water repellency. Very little adhesion among the hay fibers was observed.

GENERAL OBSERVATIONS WITH RESPECT TO FORMULATION 1, 2, 3 AND 4 COMPOSITIONS

In general, all four formulations provide good coatings for harvested material such as hay. The coated feed stock appears to be acceptable to animals, and the preferred coatings can be manufactured from materials readily available. It is noted that, for the most part, the coatings will only be found in the outer 7% t 25% of the hay being treated, so that the amount of composition eaten by any animal would be relatively low.

The coatings, again, are particularly useful for imparting to the hay or other material coated a moisture resistant or repellent. This is achieved with either the emulsion coating or the adhesive coating. Further, both coatings may include antimicrobial compounds therein, to aid in preservation of the material coated. However, both the emulsion coatings and the adhesive coatings are effective in the absence of the antimicrobial compounds or preserving agents. Formulation 1, 2 and 3 compounds also include substances leading to an adhesive effect, thus aiding in the preservation of the physical integrity of the material coated. This can be particularly important in very large hay bales or haystacks, or where it is anticipated that the hay will be exposed to severe weather elements or rough travel. However it will be understood that this invention may be applied to agricultural products other than hay. It is to be understood that while certain embodiments of the present invention have been illustrated and described, it is not to be limited to the specific forms described, except as limited by the following claims.

What is claimed and desired to be secured by Letters Patent is as follows:

1. An oil-in-water emulsion for treating hay, milo, or silage, to coat same with a generally water-resistant coating, said composition consisting essentially of the following components in the following ratios by weight, later diluted with a sufficient amount of water to enable spreading over harvested material to be coated:
  (a) about 16 to about 20 parts of soybean oil;
  (b) about 16 to about 20 parts of an emulsifier containing acetylated monoglycerides;
  (c) about 1 to 1.5 parts diethanolamine;
  (d) about 1 to 1.5 parts of an emulsifier containing polyenthylene glycol-8-oleates;
  (e) about 1 to 2 parts glyceryl triacetate;
  (f) about 0.25 to about 1.0 parts of a polyacrylamide emulsifier; and
  (g) about 0.5 to about 2.0 parts propionic acid.

2. An oil-in-water emulsion concentrate for forming an emulsion solution usable for coating hay, milo, or silage to generate a water resistant coating thereon; said emulsion concentrate consisting essentially of the following by volume:
  (a) about 16 to about 20% soybean oil;
  (b) about 16 to about 20% of an emulsifier containing primarily acetylated monoglycerides;
  (c) about 1.0 to about 1.5% diethanolamine;
  (d) about 1.0 to about 1.5% of an emulsifier containing primarily polyethylene glycol-8-oleate compounds;
  (e) about 1.0 to about 2.0% glyceryl triacetate;

(f) about 0.25 to about 1.0% of a polyacrylamide emulsion;
(g) about 0.5 to about 2.0% propionic acid; and
(h) about 64 to about 52% water.

3. A method of forming an oil-in-water emulsion for use in coating hay, milo, or silage, comprising the steps of:
   (a) preparing a first mixture by mixing diethanolamine with water;
   (b) preparing a second mixture by mixing an edible oil with an acetylated monoglyceride emulsifying agent;
   (c) mixing said second mixture with said first mixture, producing in a third mixture; and
   (d) adding an oil-in-water emulsion-forming effective amount of the following to said third mixture:
      (i) a polyethylene glycol-8-oleate emulsifying agent;
      (ii) glyceryl triacetate; and
      (iii) a polyacrylamide emulsifying agent.

4. A method of forming an oil-in-water emulsion for use in coating hay, milo, or silage to introduce water resistance therein, said method comprising the steps of:
   (a) preparing a first mixture by mixing diethanolamine with water;
   (b) preparing a second mixture by mixing an edible oil with an acetylated monoglyceride emulsifying agent;
   (c) mixing the second mixture into the first mixture, to result in a third mixture;
   (d) adding an oil-in-water emulsion-forming effective amount of the following to the third mixture:
      (i) a polyethylene glycol-8-oleate emulsifying agent;
      (ii) glyceryl triacetate; and
      (iii) a polyacrylamide emulsifying agent; and
   (e) adding, very slowly, an antimicrobial-effective amount of a preserving agent to the mixture resulting from Step (d).

5. A method of preparing a composition for use in treating hay, milo, or silage; said method comprising the steps of:
   (a) preparing a first aqueous mixture of casein, water and a base;
   (b) mixing a second aqueous mixture of sodium carboxymethylcellulose and water;
   (c) adding triacetin and a polyethylene glycol 400 emulsifier to said second mixture;
   (d) adding the second mixture to the first mixture; and,
   (e) adding a preserving agent to the mixture resulting from step (d).

6. A method of preparing a composition for use in treating hay, milo, or silage; said method consisting of the steps of:
   (a) preparing a first aqueous mixture consisting essentially of casein, water and a base;
   (b) mixing a second aqueous mixture consisting essentially of sodium carboxymethylcellulose and water;
   (c) adding triacetin and a polyethylene glycol 400 emulsifier to said second mixture; and
   (d) adding the second mixture to the first mixture.

* * * * *